United States Patent
Sakhnini et al.

(10) Patent No.: US 12,167,413 B2
(45) Date of Patent: Dec. 10, 2024

(54) NON-COHERENT DOWNLINK (DL) CONTROL CHANNEL FOR HIGHER BANDS

(71) Applicant: QUALCOMM Incorporated, San Diego, CA (US)

(72) Inventors: Iyab Issam Sakhnini, San Diego, CA (US); Tao Luo, San Diego, CA (US); Jing Sun, San Diego, CA (US); Xiaoxia Zhang, San Diego, CA (US); Jun Ma, San Diego, CA (US)

( * ) Notice: Subject to any disclaimer, the term of this patent is extended or adjusted under 35 U.S.C. 154(b) by 396 days.

(21) Appl. No.: 17/647,305

(22) Filed: Jan. 6, 2022

(65) Prior Publication Data

US 2023/0217451 A1 Jul. 6, 2023

(51) Int. Cl.
*H04W 72/14* (2009.01)
*H04W 72/044* (2023.01)
*H04W 72/0446* (2023.01)
*H04W 72/23* (2023.01)

(52) U.S. Cl.
CPC ....... *H04W 72/23* (2023.01); *H04W 72/0446* (2013.01); *H04W 72/046* (2013.01)

(58) Field of Classification Search
CPC ..... H04W 72/14; H04W 72/12; H04W 72/04; H04W 72/21; H04W 72/00; H04W 72/23; H04W 12/04; H04W 12/79; H04W 76/27; H04W 72/54; H04W 52/02; H04W 24/08; H04W 28/02; H04L 5/00; H04L 27/23; H04L 27/21; H04L 25/03; H04L 27/26; H04L 1/00; H04L 1/16; H04L 1/18; H04L 27/20; H04B 7/04; G06F 17/14
USPC ......................................................... 370/329
See application file for complete search history.

(56) References Cited

U.S. PATENT DOCUMENTS

| | | | | |
|---|---|---|---|---|
| 9,948,443 | B2 * | 4/2018 | Kusashima | H04L 1/00 |
| 10,560,959 | B2 * | 2/2020 | Kumar | H04W 72/21 |
| 11,363,451 | B2 * | 6/2022 | Dou | H04L 5/0053 |
| 11,375,481 | B2 * | 6/2022 | Matsumura | H04W 72/21 |
| 11,424,975 | B2 * | 8/2022 | Landis | H04L 27/2634 |
| 11,677,491 | B2 | 6/2023 | Sakhnini et al. | |
| 11,758,526 | B2 * | 9/2023 | Kim | H04L 27/26025 370/329 |

(Continued)

FOREIGN PATENT DOCUMENTS

WO  WO-2021211222 A1  10/2021

OTHER PUBLICATIONS

International Search Report and Written Opinion—PCT/US2022/081963—ISA/EPO—Apr. 24, 2023 (2106073WO).

*Primary Examiner* — Man U Phan

(57) ABSTRACT

Systems, methods, and devices for wireless communication that support mechanisms for non-coherent, sequence-based downlink control signaling in a wireless communication system. In aspects, the mechanisms for non-coherent, sequence-based downlink control signaling may include a new non-coherent, sequence-based downlink control channel or signal transmitted from a base station to a user equipment (UE) and configured to convey information bits (e.g., control information bits) to the UE. The UE may receive a signal transmitted over the new non-coherent, sequence-based downlink control channel and may decode the signal to extract the control information. The UE may then apply a control based on the control information received from the base station in the signal over the non-coherent, sequence-based downlink control channel.

26 Claims, 7 Drawing Sheets

(56) References Cited

U.S. PATENT DOCUMENTS

| | | | |
|---|---|---|---|
| 11,825,462 B2* | 11/2023 | Yang | H04W 72/21 |
| 11,916,713 B2 | 2/2024 | Sakhnini et al. | |
| 11,937,241 B2* | 3/2024 | Baldemair | H04W 72/21 |
| 2021/0328635 A1* | 10/2021 | Huang | H04W 72/21 |
| 2021/0368440 A1* | 11/2021 | Landis | H04W 72/23 |
| 2022/0123890 A1 | 4/2022 | Sakhnini et al. | |
| 2022/0416993 A1* | 12/2022 | Berger | H04L 5/0023 |
| 2023/0189266 A1* | 6/2023 | Saggar | H04L 5/0091 370/329 |
| 2023/0254865 A1* | 8/2023 | Lidian | H04W 72/541 370/329 |

\* cited by examiner

NON-COHERENT DOWNLINK (DL) CONTROL CHANNEL FOR HIGHER BANDS

TECHNICAL FIELD

Aspects of the present disclosure relate generally to wireless communication systems, and more particularly, to mechanisms for downlink control signaling using a non-coherent, sequence-based downlink control channel.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication performed by a user equipment (UE) includes receiving, from a base station, a signal over a non-coherent sequence-based downlink channel. In aspects, the signal may include control information for the UE. The method further includes decoding the signal received over the non-coherent sequence-based downlink channel to obtain the control information, and applying a control based on the control information in the received signal.

In an additional aspect of the disclosure, a method of wireless communication performed by a base station includes configuring, in a signal to be transmitted over a non-coherent sequence-based downlink channel to a UE, a control to be applied by the UE, encoding the non-coherent sequence-based downlink channel over which the signal is to be transmitted, and transmitting, to the UE, the signal over the non-coherent sequence-based downlink channel.

In an additional aspect of the disclosure, an apparatus (e.g., a UE) includes at least one processor and a memory coupled to the at least one processor. The at least one processor stores processor-readable code that, when executed by the at least one processor, is configured to perform operations including receiving, from a base station, a signal over a non-coherent sequence-based downlink channel. In aspects, the signal may include control information for the UE. The operations further include decoding the signal received over the non-coherent sequence-based downlink channel to obtain the control information, and applying a control based on the control information in the received signal.

In an additional aspect of the disclosure, an apparatus (e.g., a base station) includes at least one processor and a memory coupled to the at least one processor. The at least one processor stores processor-readable code that, when executed by the at least one processor, is configured to perform operations including configuring, in a signal to be transmitted over a non-coherent sequence-based downlink channel to a UE, a control to be applied by the UE, encoding the non-coherent sequence-based downlink channel over which the signal is to be transmitted, and transmitting, to the UE, the signal over the non-coherent sequence-based downlink channel.

In an additional aspect of the disclosure, a non-transitory computer-readable medium stores instructions that, when executed by a processor, cause the processor to perform operations. The operations include receiving, by a UE from a base station, a signal over a non-coherent sequence-based downlink channel. In aspects, the signal may include control information for the UE. The operations further include decoding the signal received over the non-coherent sequence-based downlink channel to obtain the control information, and applying a control based on the control information in the received signal.

In an additional aspect of the disclosure, a non-transitory computer-readable medium stores instructions that, when executed by a processor, cause the processor to perform operations. The operations include configuring, in a signal to be transmitted over a non-coherent sequence-based downlink channel to a UE, a control to be applied by the UE, encoding the non-coherent sequence-based downlink channel over which the signal is to be transmitted, and transmitting, to the UE, the signal over the non-coherent sequence-based downlink channel.

In an additional aspect of the disclosure, an apparatus includes means for receiving, from a base station, a signal over a non-coherent sequence-based downlink channel. In aspects, the signal may include control information for the UE. The apparatus further include means for decoding the signal received over the non-coherent sequence-based downlink channel to obtain the control information, and means for applying a control based on the control information in the received signal.

In an additional aspect of the disclosure, an apparatus includes means for configuring, in a signal to be transmitted over a non-coherent sequence-based downlink channel to a UE, a control to be applied by the UE, means for encoding the non-coherent sequence-based downlink channel over which the signal is to be transmitted, and means for transmitting, to the UE, the signal over the non-coherent sequence-based downlink channel.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
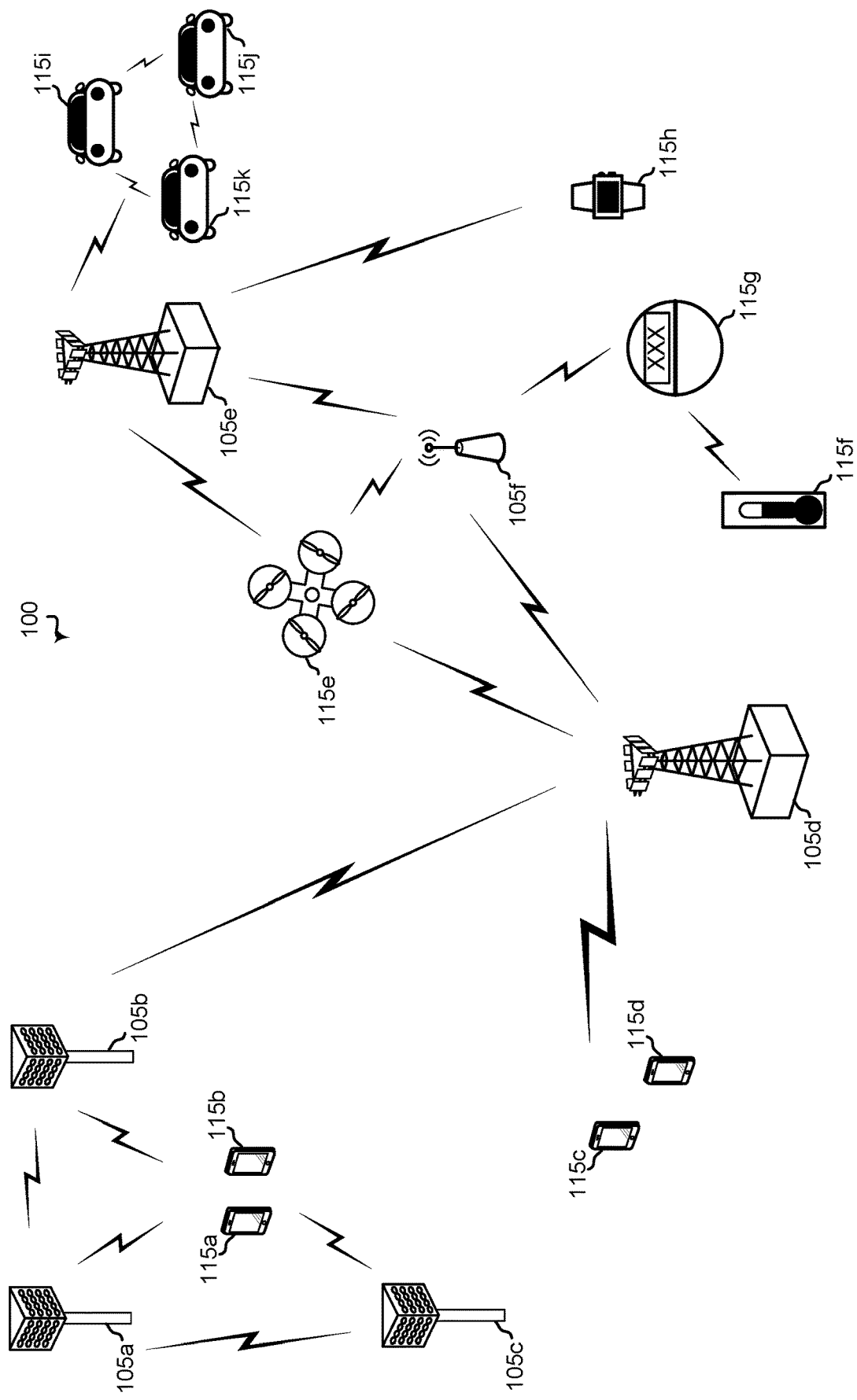
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/see), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Figure 2:
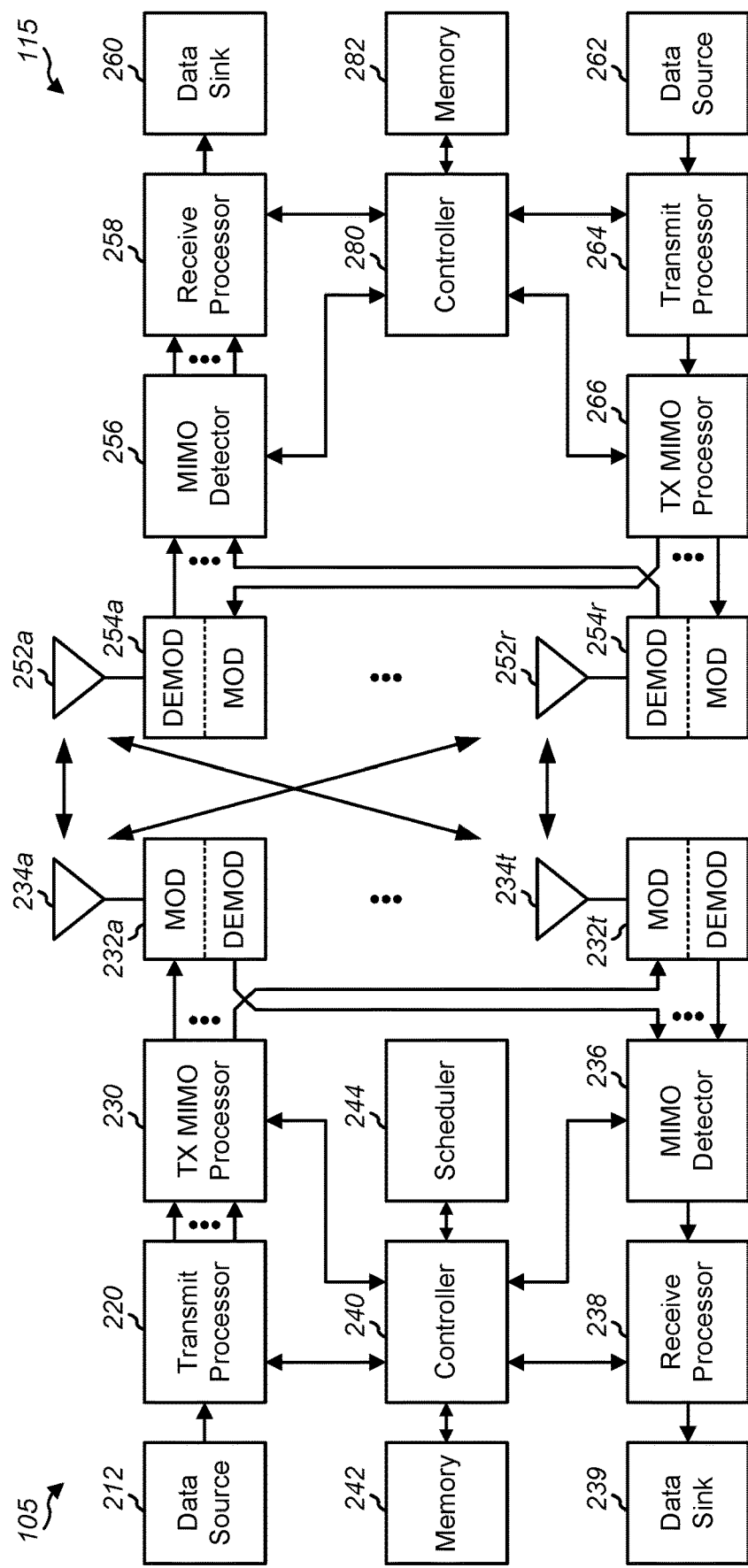
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 4 and 5, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

In current implementations of wireless communication systems, communications over higher bands may provide certain advantages. For example, higher operating bands may provide larger bandwidths, which is why some current implementations (e.g., 5G NR) consider higher bands as advantageous. Several waveforms are being considered for use in higher bands. One waveform being considered for downlink/uplink operation in higher bands is the CP-OFDM waveform. A CP-OFDM waveform may be CP based, and may involve higher complexity, but may offer a single tap frequency domain equalization (FDE), an efficient bandwidth utilization, an increased subcarrier pacing (SCS), and a higher order MIMO operation. Another waveform being considered for downlink/uplink operation in higher bands is a single carrier frequency domain waveform, which may include direct Fourier transform (DFT)-spread-OFDM waveforms. A single carrier frequency domain waveform may be CP or guard interval (GI) based, and may involve higher complexity and FDM with peak to average power (PAPR) ratio impact, but may offer a single tap FDE, an efficient bandwidth utilization, and an increased SCS. Another waveform being considered for downlink/uplink operation in higher bands is a single carrier time domain waveform, which may include SC-quadrature amplitude modulation (QAM) waveforms. A single carrier time domain waveform may be CP or GI based, and may require guard bands, but may offer a lower complexity, a single tap FDE or TDE, with TD filtering may lead to lower PAPR, and may be optimal for lower signal to noise ratio (SNR).

However, employing higher bands may require consideration of various issues. For example, using higher bands may result in a higher phase noise (PN) and may potentially increase UE complexity. In addition, in order to use higher bands, PAPR may need to be lowered. Furthermore, in communications over higher bands, symbol durations and slot durations may become shorter than with lower bands, as the SCS may be larger in higher bands. A symbol duration is typically calculated as 1/SCS.

With consideration of the above, one of the issues with using higher bands is that a search space (SS) set may become sparse. For example, in higher bands, a time for a UE to decode a downlink control information (DCI) message may be considerable, taking up to multiple symbols or even extending beyond a single slot. In this case, an SS set periodicity within a slot may not be possible since the UE may not have time to decode the DCI before the beginning of a next slot. As such, a sparser SS set may be required in this case, which may limit scheduling flexibility.

Another issue with using higher bands involves buffering. A UE operating in higher bands may not be aware of the value of the time domain resource allocation (TDRA) until the UE has decoded the DCI message. As such, the UE may need to buffer signal samples starting from the time when the DCI is received until the time the DCI is decoded, in case a PDSCH transmission is present in the transmission before the UE has decoded the entire DCI (e.g., when the TDRA value<the time taken by the UE to decode the DCI). As the symbol duration is shorter in higher band implementations, more sample buffering may be needed in this situation, which would require more UE memory.

Yet another issue with using higher bands involves power consumption. A UE operating in higher bands may perform a higher amount of PDCCH blind decoding, which may lead to an increase in power consumption. In addition, if a small number of downlink information control bits need to be conveyed to the UE, using DCI on a PDCCH may be resource and power inefficient in higher operating bands. For example, transmission configuration indicator (TCI) state updates, modulation and coding scheme (MCS) changes, indication of K0 index, (e.g., to control buffering), etc. may be indicated in a small number of bits, and making the UE wait for a DCI message to obtain this information may add delays and transmitting this information a DCI message may be overkill.

Various aspects of the present disclosure are directed to systems and methods that support mechanisms for non-coherent, sequence-based downlink control signaling in a wireless communication system. In aspects, the mechanisms for non-coherent, sequence-based downlink control signaling may include a new non-coherent, sequence-based downlink control channel or signal transmitted from a base station to a UE and configured to convey information bits (e.g., control information bits) to the UE. The UE may receive a signal transmitted over the new non-coherent, sequence-based downlink control channel and may decode the signal to extract the control information. The UE may then apply a control based on the control information received from the base station in the signal over the non-coherent, sequence-based downlink control channel.

As used herein, a non-coherent channel may be a channel that does not require channel estimation for transmitting over the non-coherent channel, and hence, does not include a demodulation reference signal (DMRS). In aspects, the non-coherent, sequence-based downlink control channel may not be configured with the modulation structure of current legacy PDCCH, and instead may be encoded using a sequence. The sequence may be based on any combination of various sequence-based encoding techniques. For example, in aspects, the sequence used to encode the non-coherent, sequence-based downlink control channel may be based on at least one sequence parameter, a time domain index modulation (TD-IM), and/or a spatial domain index modulation (SD-IM). The UE may receive the signal and may decode the non-coherent, sequence-based downlink control channel by attempting multiple hypotheses of the sequence used to encode the downlink channel. The hypothesis that passes may be deemed the determined sequence and may be used as the signal including the control information. The UE may extract the control information from the determined sequence.

Figure 3:
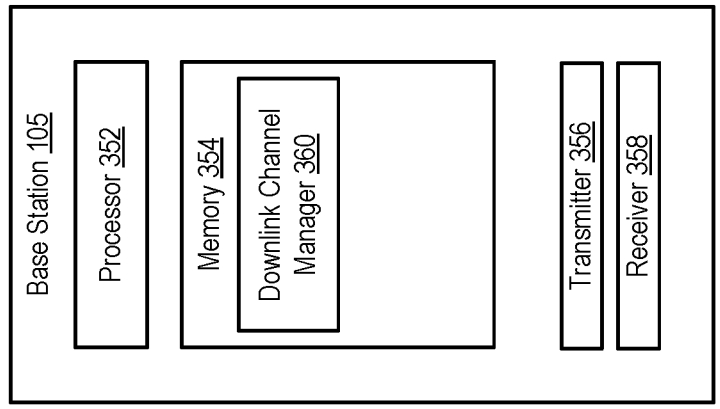
FIG. 3 is a block diagram illustrating an example wireless communication system that supports mechanisms for non-coherent, sequence-based downlink control signaling in a wireless communication system according to one or more aspects.
Figure 3:
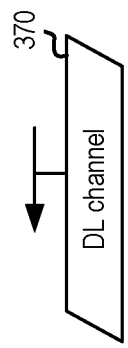
Figure 3:
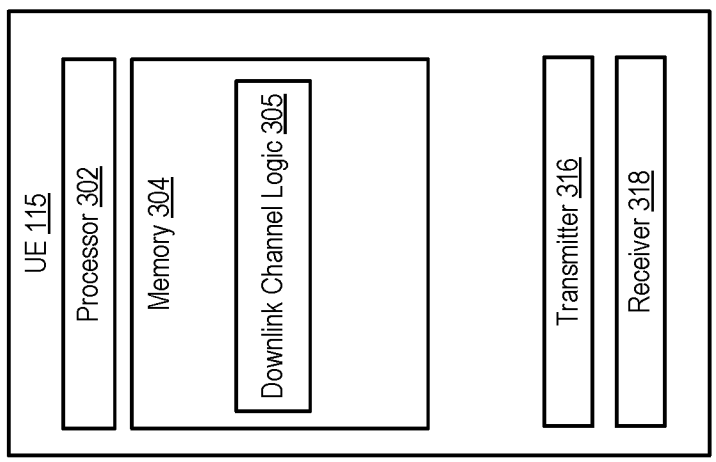

FIG. 3 is a block diagram of an example wireless communications system 300 that supports mechanisms for non-coherent, sequence-based downlink control signaling in a wireless communication system according to one or more aspects. In some examples, wireless communications system 300 may implement aspects of wireless network 100. Wireless communications system 300 includes UE 115 and base station 105. Although one UE 115 and one base station 105 are illustrated, in some other implementations, wireless communications system 300 may generally include multiple UEs 115, and may include more than one base station 105.

UE 115 may include a variety of components (such as structural, hardware components) used for carrying out one or more functions described herein. For example, these components may include one or more processors 302 (hereinafter referred to collectively as "processor 302"), one or more memory devices 304 (hereinafter referred to collectively as "memory 304"), one or more transmitters 316 (hereinafter referred to collectively as "transmitter 316"), one or more receivers 318 (hereinafter referred to collectively as "receiver 318"), and one or more antenna modules 306 (hereinafter referred to collectively as "antenna module 306"). Processor 302 may be configured to execute instructions stored in memory 304 to perform the operations described herein. In some implementations, processor 302 includes or corresponds to one or more of receive processor 258, transmit processor 264, and controller 280, and memory 304 includes or corresponds to memory 282.

Memory 304 includes or is configured to store downlink channel logic 305. In aspects, downlink channel logic 305 is configured to perform operations for receiving and decoding non-coherent sequence-based downlink control channel 370, and to extract control information encoded in non-coherent sequence-based downlink control channel 370 in accordance with aspects of the present disclosure.

Transmitter 316 is configured to transmit reference signals, control information and data to one or more other devices, and receiver 318 is configured to receive references signals, synchronization signals, control information and data from one or more other devices. For example, transmitter 316 may transmit signaling, control information and data to, and receiver 318 may receive signaling, control information and data from, base station 105. In some implementations, transmitter 316 and receiver 318 may be integrated in one or more transceivers. Additionally or alternatively, transmitter 316 or receiver 318 may include or correspond to one or more components of UE 115 described with reference to FIG. 2.

Base station 105 may include a variety of components (such as structural, hardware components) used for carrying out one or more functions described herein. For example, these components may include one or more processors 352 (hereinafter referred to collectively as "processor 352"), one or more memory devices 354 (hereinafter referred to collectively as "memory 354"), one or more transmitters 356 (hereinafter referred to collectively as "transmitter 356"), and one or more receivers 358 (hereinafter referred to collectively as "receiver 358"). Processor 352 may be configured to execute instructions stored in memory 354 to perform the operations described herein. In some implementations, processor 352 includes or corresponds to one or more of receive processor 238, transmit processor 220, and controller 240, and memory 354 includes or corresponds to memory 242.

Memory 354 includes or is configured to store downlink channel manager 360. In aspects, downlink channel manager 360 may be configured to perform operations for encoding control information into non-coherent sequence-based downlink control channel 370 and for causing transmission of non-coherent sequence-based downlink control channel 370 to UE 115 in accordance with aspects of the present disclosure.

Transmitter 356 is configured to transmit reference signals, synchronization signals, control information and data to one or more other devices, and receiver 358 is configured to receive reference signals, control information and data from one or more other devices. For example, transmitter 356 may transmit signaling, control information and data to, and receiver 358 may receive signaling, control information and data from, UE 115. In some implementations, transmitter 356 and receiver 358 may be integrated in one or more transceivers. Additionally or alternatively, transmitter 356 or receiver 358 may include or correspond to one or more components of base station 105 described with reference to FIG. 2.

In some implementations, wireless communications system 300 implements a 5G NR network. For example, wireless communications system 300 may include multiple 5G-capable UEs 115 and multiple 5G-capable base stations 105, such as UEs and base stations configured to operate in accordance with a 5G NR network protocol such as that defined by the 3GPP.

During operation of wireless communications system 300, base station 105 may transmit a signal over non-coherent sequence-based downlink control channel 370 to UE 115. In aspects, the signal transmitted to UE 115 over non-coherent sequence-based downlink control channel 370 may include control information for UE 115. In some aspects, the signal received over non-coherent sequence-based downlink channel 370 may be multiplexed with one or more additional signals. The one or more additional signals may be signals that include control information intended for other UEs. In aspects, the multiplexing of the signal and the one or more additional signals transmitted over non-coherent sequence-based downlink control channel 370 may be multiplexing in time, in frequency, based on a code or sequence, TD-IM based multiplexing, SD-IM based multiplexing, etc.

In aspects, the signal transmitted over non-coherent sequence-based downlink control channel 370 may be a downlink control signal transmitted from base station 105 to UE 115 and may be configured to convey control information to UE 115. The control information may be encoded in non-coherent sequence-based downlink control channel 370 based on a sequence. In this manner, non-coherent sequence-based downlink control channel 370 may not be configured with the modulation structure of current legacy PDCCH, but instead may be encoded using a sequence.

In aspects, the sequence used to encode the control information into non-coherent sequence-based downlink control channel 370 may be a sequence configured based on various parameters. For example, a non-exhaustive list of sequence parameters that may be used to configure the sequence for encoding non-coherent sequence-based downlink control channel 370 may include cyclic shifts, roots, initializations, etc. In aspects, different sequence parameters may be used to encode the control information. For example, the sequence parameters may include a plurality of different cyclic shifts. In this case, the number of cyclic shifts in the plurality of different cyclic shifts that may be used in the sequence to encode non-coherent sequence-based downlink control channel 370 may determine an amount of control information bits that may be encoded. For example, where two cyclic shifts may be used, two bits of information may be encoded. In this case, UE 115 may detect which of the two cyclic shifts was used to encode the control information into non-coherent sequence-based downlink control channel 370 and in this manner, two bits of control information may be sent to UE 115. UE 115 may detect which of the two cyclic shifts is used because UE 115 may decode non-coherent sequence-based downlink control channel 370 may attempting different hypotheses for the sequence and determining which hypothesis passes. The hypothesis that passes is determined by UE 115 to be the sequence used by base station 105 to encode non-coherent sequence-based downlink control channel 370. In other examples, more than two cyclic shifts may be used to encode a higher number of bits. In the same manner as with the cyclic shifts example above, other sequence parameters may be used to encode control information into non-coherent sequence-based downlink control channel 370.

In aspects, the sequence used to encode the control information into non-coherent sequence-based downlink control channel 370 may be a sequence based on a TD-IM. In TD-IM based encoding, control information may be transmitted in a coded sequence, and the encoding may be based on the presence or absence of a transmission in the transmission according to a time pattern within a transmission window. For example, each sequence in a TD-IM based encoding may be used as a bit. In this manner, base station 105 may encode information by transmitting or foregoing transmitting a sequence over the non-coherent sequence-based downlink control channel 370 depending on the desired encoding. For example, in an exemplary TD-IM based encoding of non-coherent sequence-based downlink control channel 370, four time-based sequences may be configured. In this example, a determination that one of the sequences is transmitted may be determined to be a "1", and an absence of a transmission of the sequence is determined to be a "0." In this manner, if the first and second sequences are not sent, and the third and fourth sequences are sent over non-coherent sequence-based downlink control channel 370, then UE 115a may determine to have received a 0011=3 indication. In another example, if the first and fourth sequences are sent, but the second and third sequences are not sent over non-coherent sequence-based downlink control channel 370, then UE 115a may determine to have received a 1001=9 indication. In this manner, with four sequences, base station 105 may transmit up to $2^{4-1}$ values of information may be transmitted to UE 115. For example, non-coherent sequence-based downlink control channel 370 may be used to transmit an indication of a TCU state to UE 115, and the TCI state may be indicated by the value encoded by the TD-IM based encoding. It will be appreciated that the example discussed above of a TD-IM based encoding using four sequences is merely for illustrative purposes, and any other number N of sequences may be used to transmit up to $2^n$ values of information.

In aspects, the sequence used to encode the control information into non-coherent sequence-based downlink control channel 370 may be a sequence based on an SD-IM. In SD-IM based encoding, control information may be encoded based on the ports used to transmit over non-coherent sequence-based downlink control channel 370. For example, the sequence may be determined based on the ports detected by UE 115, where each port detected may be considered a bit in the sequence. In an example, UE 115 may detect that port 0, and port 3 are used, in which case UE 115a may determine to have received a 0101=5 indication.

In aspects, the signal transmitted to UE 115 over non-coherent sequence-based downlink control channel 370 may include various control information. The control information may include an indication for UE 115 to enable or disable a control resource set (CORESET) and/or a search space (SS) set. The indication to enable or disable the CORESET and/or the SS set may be used by UE 115 to determine that no CORESET and/or SS set may be needed unless indicated by an "enable" indication in the control information. In aspects, the indication to enable the CORESET and/or the SS set may include a CORESET identification (ID) and/or an SS set ID. For example, the sequence used to encode the signal transmitted to UE 115 over non-coherent sequence-based downlink control channel 370 may be configured to point to the CORESET ID or the SS set ID. For example, where the sequence indicates a 0011 (as described above), UE 115 may determine that the CORESET ID or the SS set ID is 0011. In some aspects, UE 115 may share the same sequence but may also be configured to point to more than one CORSET and/or SS set.

In aspects, the control information included in the signal transmitted to UE 115 over non-coherent sequence-based downlink control channel 370 may include an indication of a beam change by base station 105, an indication of a modulation and coding scheme (MCS) change by base station 105, and/or an indication of a K0 index to be used by UE 115 for feedback of a PDSCH transmission. In aspects, the control information may include a trigger of a reference signal (RS) transmission (e.g., a CSI-RS), an indication to continue a previously received grant, and/or an indication to enable a predefined dynamic grant. In some aspects, the control information may include an indication to enable, disable, or to modify a semi-persistent scheduled (SPS) configured grant (CG) granted to UE 115 by base station 105. It is noted that in aspects, the control information may include other control information, and the description of the specific control information above is merely for illustrative purposes and should not be construed as limiting in any way.

In aspects, the signal transmitted to UE 115 over non-coherent sequence-based downlink control channel 370 may be transmitted using a particular format. For example, one or more formats may be defined to be used for configuring the signal that includes the control information transmitted to UE 115. In aspects, the formats defined and/or selected for the transmission of the control information to UE 115 over non-coherent sequence-based downlink control channel 370 may depend on various factors. For example, the format of the transmission of the control information to UE 115 over non-coherent sequence-based downlink control channel 370 may depend on a number of bits that may be required to convey the control information for the UE. In some aspects, the format of the transmission of the control information to UE 115 over non-coherent sequence-based downlink control channel 370 may depend on a reliability of non-coherent sequence-based downlink channel 370. In some aspects, the format of the transmission of the control information to UE 115 over non-coherent sequence-based downlink control channel 370 may depend on a number of multiplexed signals (e.g., the signal and any additional signals) in the transmission over non-coherent sequence-based downlink control channel 370.

During operation of wireless communications system 300, UE 115 may receive the signal transmitted over non-coherent sequence-based downlink control channel 370 including the control information. UE 115 may decode the signal to extract the control information. For example, as noted above, UE 115 may attempt multiple hypotheses of the sequence used to encode the signal including the control information. The hypothesis that passes may be determined to be the sequence used by base station 105 to encode the control information. UE 115 may use the determine sequence to extract the control information from the determined sequence.

UE 115 may apply a control based on the control information received from the base station in the signal over non-coherent sequence-based downlink control channel 370. For example, where the control information indicate a CORESET/SS set, UE 115 may use the control information to determine a CORSET/SS set to use. In another example, where the control information indicates a beam change or MCS change by base station 105, UE 115 may perform a beam change or MCS change to match the change at base station 105, in accordance with the indication in the control information. Similarly, UE 115 may use other indications and information in the control information to apply a control based on the indications and/or information in the control information.

In aspects, there may be a time period between the timing of the signal received by UE 115 over non-coherent sequence-based downlink control channel 370 and an application of the control associated with the control information in the signal. For example, there may be a time period between a timing of the signal indicating a CORSET/SS set and a timing of the indicated CORSET/SS set. In aspects, the timing period may be indicated by the control information, or may be pre-configured for UE 115. In aspects, the timing period may be based on UE 115's capabilities.

In aspects, channel encoding and error detection may be applied to non-coherent sequence-based downlink control channel 370 in order to increase reception reliability of the control information in the signal transmitted to UE 115 over non-coherent sequence-based downlink control channel 370. In aspects, the channel encoding that may be applied to non-coherent sequence-based downlink control channel 370 may include polar coding techniques, convolutional coding techniques, block coding techniques, repetition coding techniques (e.g., repetition coding techniques with a simple majority decision), etc. In aspects, an error detection scheme may be applied to the transmission of the signal including the control information over non-coherent sequence-based downlink control channel 370 in order to enable error detection to the transmission of the control information to UE 115. The error detection scheme may include cyclic redundancy check (CRC) schemes, parity bit schemes, and/or any other available error detection technique.

Figure 4:
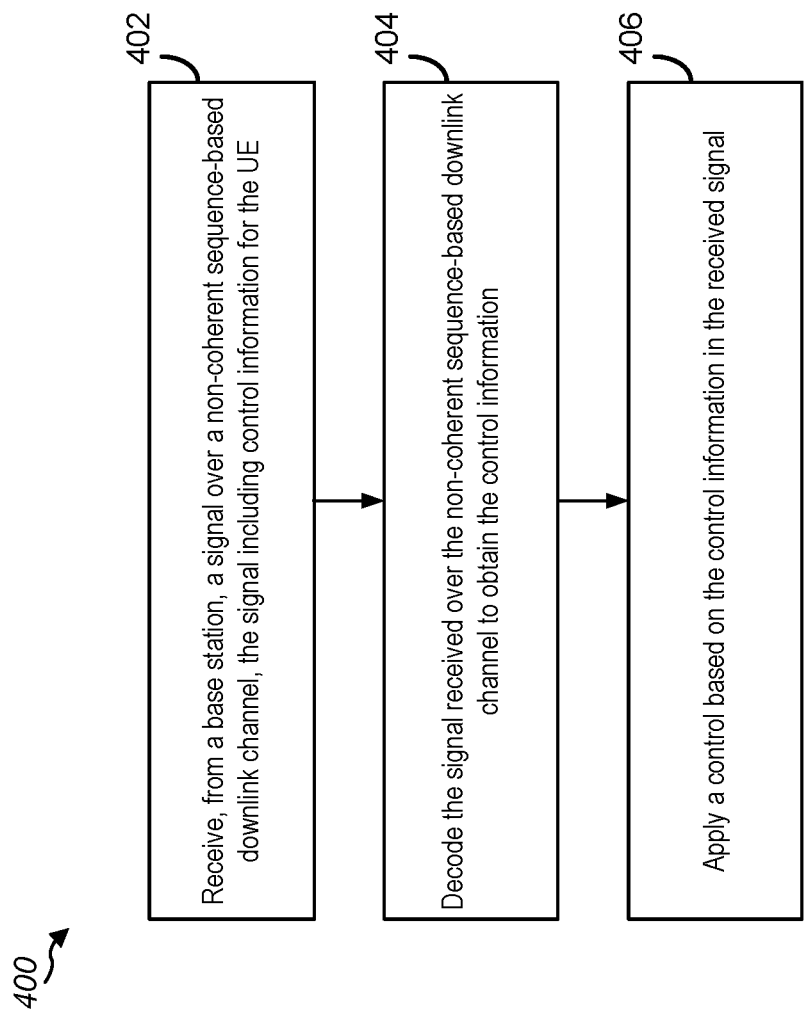
FIG. 4 is a flow diagram illustrating an example process that supports mechanisms for non-coherent, sequence-based downlink control signaling in a wireless communication system according to one or more aspects.
Figure 6:
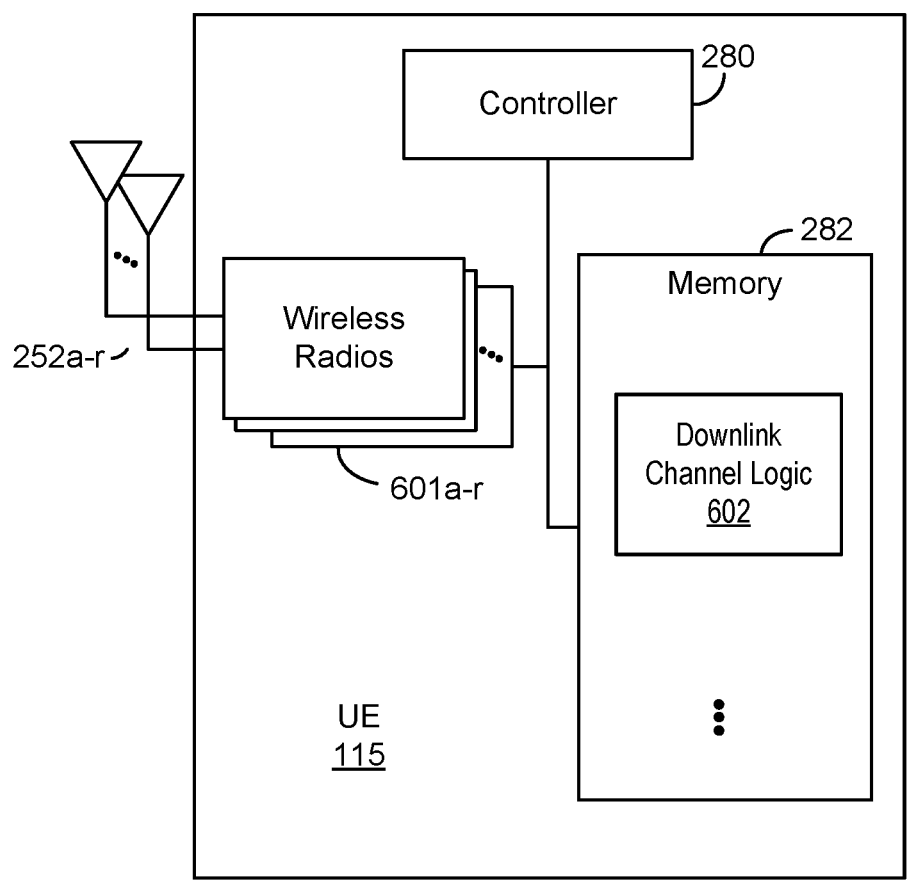
FIG. 6 is a block diagram of an example UE that supports mechanisms for non-coherent, sequence-based downlink control signaling in a wireless communication system according to one or more aspects.

FIG. 4 is a flow diagram illustrating an example process 400 that supports mechanisms for non-coherent, sequence-based downlink control signaling in a wireless communication system according to one or more aspects. Operations of process 400 may be performed by a UE, such as UE 115 described above with reference to FIGS. 1-3. For example, example operations (also referred to as "blocks") of process 400 may enable UE 115 to support mechanisms for non-coherent, sequence-based downlink control signaling. FIG. 6 is a block diagram illustrating UE 115 configured according to aspects of the present disclosure. UE 115 includes the structure, hardware, and components as illustrated in FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 601a-r and antennas 252a-r. Wireless radios 601a-r includes various components and hardware, as illustrated in FIG. 2, including modulator/demodulators 254a-r, MIMO detector 256, receive processor 258, transmit processor 264, and TX MIMO processor 266.

At block 402 of process 400, a UE (e.g., UE 115) receives, from a base station (e.g., base station 105), a signal over a non-coherent sequence-based downlink channel. In aspects, the signal may include control information for the UE. In order to implement the functionality for such operations, UE 115, under control of controller/processor 280, may receive the signal over a non-coherent sequence-based downlink channel from base station 105 via wireless radios 601a-r and antennas 252a-r. In aspects, UE 115 may perform operations to receive the signal over a non-coherent sequence-based downlink channel from base station 105 according to operations and functionality as described above with reference to transmitting UE 115a and as illustrated in FIG. 3.

At block 404 of process 400, UE 115 decodes the signal received over the non-coherent sequence-based downlink channel to obtain the control information. In order to implement the functionality for such operations, UE 115, under control of controller/processor 280, executes downlink channel logic 602, stored in memory 282. The functionality implemented through the execution environment of downlink channel logic 602 allows for UE 115 to perform operations for decoding the signal received over the non-coherent sequence-based downlink channel to obtain the control information according to the various aspects herein. In aspects, UE 115 may decode the signal received over the non-coherent sequence-based downlink channel to obtain the control information according to operations and functionality as described above with reference to UE 115 and as illustrated in FIG. 3.

At block 406 of process 400, UE 115 applies a control based on the control information in the received signal. In order to implement the functionality for such operations, UE 115, under control of controller/processor 280, executes downlink channel logic 602, stored in memory 282. The functionality implemented through the execution environment of downlink channel logic 602 allows for UE 115 to perform operations for applying a control based on the control information in the received signal according to the various aspects herein. In aspects, UE 115 may apply a control based on the control information in the received signal according to operations and functionality as described above with reference to UE 115 and as illustrated in FIG. 3.

Figure 5:
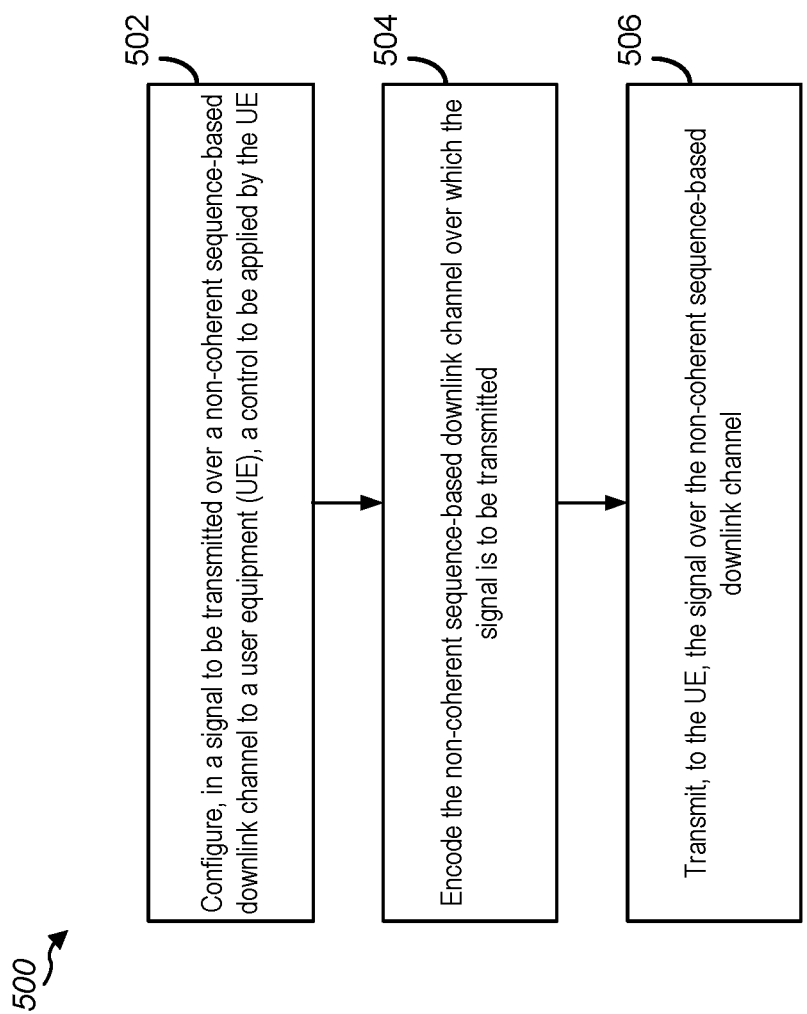
FIG. 5 is a flow diagram illustrating an example process that supports mechanisms for non-coherent, sequence-based downlink control signaling in a wireless communication system according to one or more aspects.
Figure 7:
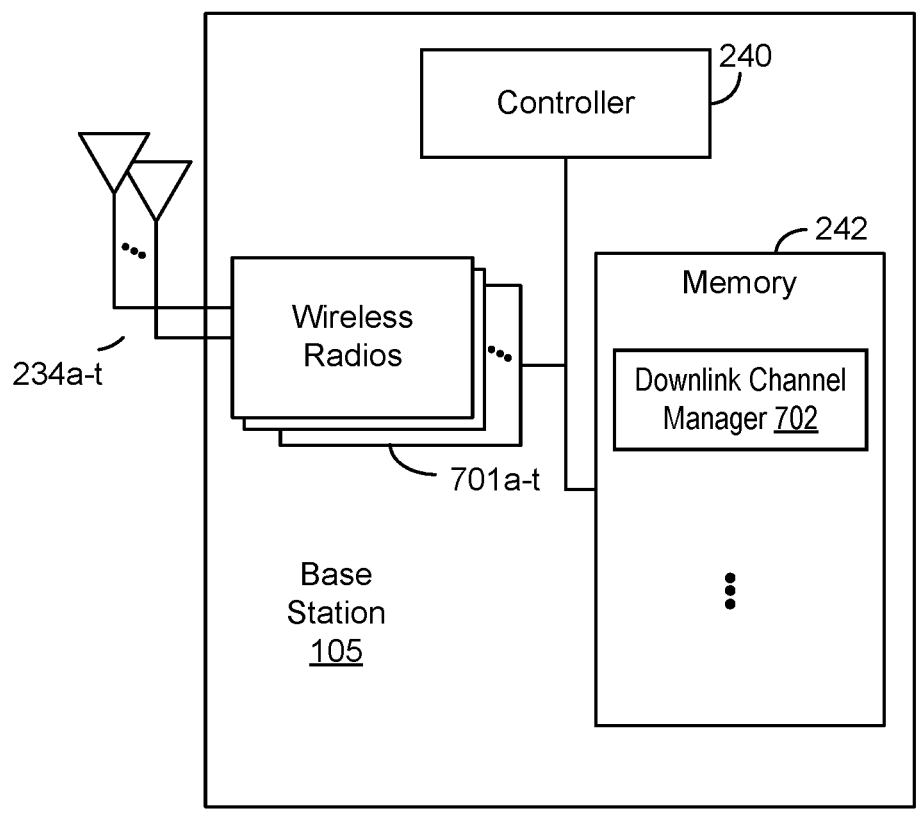
FIG. 7 is a block diagram of an example base station that supports mechanisms for non-coherent, sequence-based downlink control signaling in a wireless communication system according to one or more aspects.

FIG. 5 is a block diagram illustrating an example an example process 500 that provides for non-coherent, sequence-based downlink control signaling in a wireless communication system according to one or more aspects. Operations of process 500 may be performed by a base station, such as base station 105 described above with reference to FIGS. 1-3, or described with reference to FIG. 7. FIG. 7 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 701a-t and antennas 234a-t. Wireless radios 701a-t includes various components and hardware, as illustrated in FIG. 2 for base station 105, including modulator/demodulators 232a-t, MIMO detector 236, receive processor 238, transmit processor 220, and TX MIMO processor 230.

At block 502 of process 500, a base station (e.g., base station 105) configures, in a signal to be transmitted over a non-coherent sequence-based downlink channel to a UE, a control to be applied by the UE. In order to implement the functionality for such operations, base station 105, under control of controller/processor 240, executes downlink channel manager 702, stored in memory 242. The functionality implemented through the execution environment of downlink channel manager 702 allows for base station 105 to perform operations to configure, in a signal to be transmitted over a non-coherent sequence-based downlink channel to a UE, a control to be applied by the UE according to the various aspects herein. In aspects, base station 105 may perform operations to configure, in a signal to be transmitted over a non-coherent sequence-based downlink channel to a UE, a control to be applied by the UE according to operations and functionality as described above with reference to base station 105 and as illustrated in FIG. 3.

At block 504 of process 500, base station 105 encodes the non-coherent sequence-based downlink channel over which the signal is to be transmitted. In order to implement the functionality for such operations, base station 105, under control of controller/processor 240, executes downlink channel manager 702, stored in memory 242. The functionality implemented through the execution environment of downlink channel manager 702 allows for base station 105 to encode the non-coherent sequence-based downlink channel over which the signal is to be transmitted according to the various aspects herein. In aspects, base station 105 may perform operations to encode the non-coherent sequence-based downlink channel over which the signal is to be transmitted according to operations and functionality as described above with reference to base station 105 and as illustrated in FIG. 3.

At block 506 of process 500, base station 105 transmits, to the UE, the signal over the non-coherent sequence-based downlink channel. In order to implement the functionality for such operations, the base station, under control of controller/processor 240, transmits the signal over the non-coherent sequence-based downlink channel to the UE via wireless radios 701a-r and antennas 234a-t. In aspects, base station 105 may perform operations to transmit the signal over the non-coherent sequence-based downlink channel to the UE according to operations and functionality as described above with reference to base station 105 and as illustrated in FIG. 3.

In one or more aspects, techniques for supporting mechanisms for non-coherent, sequence-based downlink control signaling in a wireless communication system according to one or more aspects may include additional aspects, such as any single aspect or any combination of aspects described below or in connection with one or more other processes or devices described elsewhere herein. In a first aspect, supporting mechanisms for non-coherent, sequence-based downlink control signaling in a wireless communication system may include an apparatus configured to receive, from a base station, a signal over a non-coherent sequence-based downlink channel. In aspects, the signal includes control information for the UE. The apparatus is further configured to decode the signal received over the non-coherent sequence-based downlink channel to obtain the control information, and to apply a control based on the control information in the received signal. Additionally, the apparatus may perform or operate according to one or more aspects as described below. In some implementations, the apparatus includes a wireless device, such as a UE (e.g., a UE as described above). In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, alone or in combination with the first aspect, the non-coherent sequence-based downlink channel is encoded using a sequence based on at least one sequence parameter, a TD-IM, and/or a SD-IM.

In a third aspect, alone or in combination with one or more of the first aspect or the second aspect, the signal received over the non-coherent sequence-based downlink channel spans a plurality of symbols.

In a fourth aspect, alone or in combination with one or more of the first aspect through the third aspect, the signal received over the non-coherent sequence-based downlink channel includes at least one additional signal multiplexed with the signal, the at least one additional signal intended for at least one other UE.

In a fifth aspect, alone or in combination with one or more of the first aspect through the fourth aspect, the control information for the UE includes an indication for the UE to enable or disable a CORESET or a search space set, an indication of one or more of a CORESET ID or an SS set ID, an indication of a time between the signal over the non-coherent sequence-based downlink channel and one or more of the CORESET or SS set, an indication associated with a beam change, an indication associated with a MCS change, an indication of a K0 index, a triggering of an RS, an indication to continue a previously received grant, an indication to enable a predefined dynamic grant, and/or an indication to one of enable, disable, or modify an SPS configured grant.

In a sixth aspect, alone or in combination with one or more of the first aspect through the fifth aspect, the signal received over the non-coherent sequence-based downlink channel has a format, the format of the signal dependent on a number of bits required to convey the control information for the UE, a reliability of the non-coherent sequence-based downlink channel, and/or a number of additional signals multiplexed with the signal received over the non-coherent sequence-based downlink channel.

In a seventh aspect, alone or in combination with one or more of the first aspect through the sixth aspect, applying the control based on the control information in the received signal includes applying the control a preconfigured time after receiving the signal over the non-coherent sequence-based downlink channel.

In an eighth aspect, alone or in combination with one or more of the first aspect through the seventh aspect, the non-coherent sequence-based downlink channel is encoded by the base station using a channel based coding of the control information, and/or encoded for error detection.

In a ninth aspect, alone or in combination with one or more of the first aspect through the eighth aspect, the channel based coding used by the base station to encode the non-coherent sequence-based downlink channel includes a polar coding, a block coding, and/or a repetition coding.

In a tenth aspect, techniques for supporting mechanisms for non-coherent, sequence-based downlink control signaling in a wireless communication system may include an apparatus configured to configure, in a signal to be transmitted over a non-coherent sequence-based downlink channel to a UE, a control to be applied by the UE, to encode the non-coherent sequence-based downlink channel over which the signal is to be transmitted, and to transmit, to the UE, the signal over the non-coherent sequence-based downlink channel. Additionally, the apparatus may perform or operate according to one or more aspects as described below. In some implementations, the apparatus includes a wireless device, such as a base station. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In an eleventh aspect, alone or in combination with one or more of the tenth aspect through the tenth aspect, encoding the non-coherent sequence-based downlink channel includes using a sequence based on at least one sequence parameter, a TD-IM, and/or an SD-IM.

In a twelfth aspect, alone or in combination with one or more of the tenth aspect through the eleventh aspect, the signal transmitted over the non-coherent sequence-based downlink channel spans a plurality of symbols.

In a thirteenth aspect, alone or in combination with one or more of the tenth aspect through the twelfth aspect, the techniques of the tenth aspect include multiplexing at least one additional signal with the signal transmitted over the non-coherent sequence-based downlink channel, the at least one additional signal intended for at least one other UE.

In a fourteenth aspect, alone or in combination with one or more of the tenth aspect through the thirteenth aspect, the control information for the UE includes an indication for the UE to enable or disable a CORESET or a search space set, an indication of one or more of a CORESET ID or an SS set ID, an indication of a time between the signal over the non-coherent sequence-based downlink channel and one or more of the CORESET or SS set, an indication associated with a beam change, an indication associated with a MCS change, an indication of a K0 index, a triggering of an RS, an indication to continue a previously received grant, an indication to enable a predefined dynamic grant, and/or an indication to one of enable, disable, or modify an SPS configured grant.

In a fifteenth aspect, alone or in combination with one or more of the tenth aspect through the fourteenth aspect, the signal transmitted over the non-coherent sequence-based downlink channel has a format.

In a sixteenth aspect, alone or in combination with the fifteenth aspect, the format of the signal is dependent on a number of bits required to convey the control information for the UE, a reliability of the non-coherent sequence-based downlink channel, and/or a number of additional signals multiplexed with the signal received over the non-coherent sequence-based downlink channel.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-7 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a user equipment (UE), the method comprising:
   receiving, from a base station, a signal over a non-coherent sequence-based downlink channel, the signal including control information for the UE, wherein the control information for the UE includes one or more of:
      an indication for the UE to enable or disable one or more of: a control resource set (CORESET) or a search space set;
      an indication of one or more of: a CORESET identification (ID) or an SS set ID;
      an indication of a time between the signal over the non-coherent sequence-based downlink channel and one or more of: the CORESET or SS set;
      an indication associated with a beam change;
      an indication associated with a modulation and coding scheme (MCS) change;
      an indication of a K0 index;
      a triggering of a reference signal (RS);
      an indication to continue a previously received grant;
      an indication to enable a predefined dynamic grant; or
      an indication to one of: enable, disable, or modify a semi-persistent scheduled (SPS) configured grant (CG);
   decoding the signal received over the non-coherent sequence-based downlink channel to obtain the control information; and
   applying a control based on the control information in the signal received over the non-coherent sequence-based downlink channel.

2. The method of claim 1, wherein the non-coherent sequence-based downlink channel is encoded using a sequence based on one or more of:
   at least one sequence parameter;
   a time domain index modulation (TD-IM); or
   a spatial domain index modulation (SD-IM).

3. The method of claim 1, wherein the signal received over the non-coherent sequence-based downlink channel spans a plurality of symbols.

4. The method of claim 1, wherein the signal received over the non-coherent sequence-based downlink channel includes at least one additional signal multiplexed with the signal, the at least one additional signal intended for at least one other UE.

5. The method of claim 1, wherein the signal received over the non-coherent sequence-based downlink channel has a format, the format of the signal dependent on one or more of:
   a number of bits required to convey the control information for the UE;
   a reliability of the non-coherent sequence-based downlink channel; or
   a number of additional signals multiplexed with the signal received over the non-coherent sequence-based downlink channel.

6. The method of claim 1, wherein applying the control based on the control information in the signal received over the non-coherent sequence-based downlink channel includes:
   applying the control a preconfigured time after receiving the signal over the non-coherent sequence-based downlink channel.

7. The method of claim 1, wherein the non-coherent sequence-based downlink channel is one of:
   encoded by the base station using a channel based coding of the control information; or
   encoded for error detection.

8. The method of claim 7, wherein the channel based coding used by the base station to encode the non-coherent sequence-based downlink channel includes one or more of: a polar coding, a block coding, or a repetition coding.

9. A method of wireless communication performed by a base station, the method comprising:
   configuring, in a signal to be transmitted over a non-coherent sequence-based downlink channel to a user equipment (UE), a control to be applied by the UE, wherein the control to be applied by the UE includes one or more of:
      an indication for the UE to enable or disable one or more of: a control resource set (CORESET) or a search space set;
      an indication of one or more of: a CORESET identification (ID) or an SS set ID;
      an indication of a time between the signal over the non-coherent sequence-based downlink channel and one or more of: the CORESET or SS set;
      an indication associated with a beam change;

an indication associated with a modulation and coding scheme (MCS) change;
an indication of a K0 index;
a triggering of a reference signal (RS);
an indication to continue a previously received grant;
an indication to enable a predefined dynamic grant; or
an indication to one of: enable, disable, or modify a semi-persistent scheduled (SPS) configured grant (CG);
encoding the non-coherent sequence-based downlink channel over which the signal is to be transmitted; and
transmitting, to the UE, the signal over the non-coherent sequence-based downlink channel.

10. The method of claim 9, wherein encoding the non-coherent sequence-based downlink channel includes using a sequence based on one or more of:
at least one sequence parameter;
a time domain index modulation (TD-IM); or
a spatial domain index modulation (SD-IM).

11. The method of claim 9, wherein the signal transmitted over the non-coherent sequence-based downlink channel spans a plurality of symbols.

12. The method of claim 9, further comprising:
multiplexing at least one additional signal with the signal transmitted over the non-coherent sequence-based downlink channel, the at least one additional signal intended for at least one other UE.

13. The method of claim 9, wherein the signal transmitted over the non-coherent sequence-based downlink channel has a format, the format of the signal dependent on one or more of:
a number of bits required to convey control information for the UE;
a reliability of the non-coherent sequence-based downlink channel; or
a number of additional signals multiplexed with the signal received over the non-coherent sequence-based downlink channel.

14. An apparatus for wireless communication, comprising:
a memory; and
one or more processors coupled to the memory, the memory and the one or more processors being configured to:
receive, by a user equipment (UE), from a base station, a signal over a non-coherent sequence-based downlink channel, the signal including control information for the UE, wherein the control information for the UE includes one or more of:
an indication for the UE to enable or disable one or more of: a control resource set (CORESET) or a search space set;
an indication of one or more of: a CORESET identification (ID) or an SS set ID;
an indication of a time between the signal over the non-coherent sequence-based downlink channel and one or more of: the CORESET or SS set;
an indication associated with a beam change;
an indication associated with a modulation and coding scheme (MCS) change;
an indication of a K0 index;
a triggering of a reference signal (RS);
an indication to continue a previously received grant;
an indication to enable a predefined dynamic grant; or
an indication to one of: enable, disable, or modify a semi-persistent scheduled (SPS) configured grant (CG);
decode, by the UE, the signal received over the non-coherent sequence-based downlink channel to obtain the control information; and
apply, by the UE, a control based on the control information in the signal received over the non-coherent sequence-based downlink channel.

15. The apparatus of claim 14, wherein the non-coherent sequence-based downlink channel is encoded using a sequence based on one or more of:
at least one sequence parameter;
a time domain index modulation (TD-IM); or
a spatial domain index modulation (SD-IM).

16. The apparatus of claim 14, wherein the signal received over the non-coherent sequence-based downlink channel spans a plurality of symbols.

17. The apparatus of claim 14, wherein the signal received over the non-coherent sequence-based downlink channel includes at least one additional signal multiplexed with the signal, the at least one additional signal intended for at least one other UE.

18. The apparatus of claim 14, wherein the signal received over the non-coherent sequence-based downlink channel has a format, the format of the signal dependent on one or more of:
a number of bits required to convey the control information for the UE;
a reliability of the non-coherent sequence-based downlink channel; or
a number of additional signals multiplexed with the signal received over the non-coherent sequence-based downlink channel.

19. The apparatus of claim 14, wherein configuration of the memory and the one or more processors to apply the control based on the control information in the signal received over the non-coherent sequence-based downlink channel includes configuration of the memory and the one or more processors to:
apply the control a preconfigured time after receiving the signal over the non-coherent sequence-based downlink channel.

20. The apparatus of claim 14, wherein the non-coherent sequence-based downlink channel is one of:
encoded by the base station using a channel based coding of the control information; or
encoded for error detection.

21. The apparatus of claim 20, wherein the channel based coding used by the base station to encode the non-coherent sequence-based downlink channel includes one or more of: a polar coding, a block coding, or a repetition coding.

22. An apparatus for wireless communication, comprising:
a memory; and
one or more processors coupled to the memory, the memory and the one or more processors being configured to:
configure, by a base station, in a signal to be transmitted over a non-coherent sequence-based downlink channel to a user equipment (UE), a control to be applied by the UE, wherein the control to be applied by the UE includes one or more of:
an indication for the UE to enable or disable one or more of: a control resource set (CORESET) or a search space set;

an indication of one or more of: a CORESET identification (ID) or an SS set ID;

an indication of a time between the signal over the non-coherent sequence-based downlink channel and one or more of: the CORESET or SS set;

an indication associated with a beam change;

an indication associated with a modulation and coding scheme (MCS) change;

an indication of a K0 index;

a triggering of a reference signal (RS);

an indication to continue a previously received grant;

an indication to enable a predefined dynamic grant; or an indication to one of: enable, disable, or modify a semi-persistent scheduled (SPS) configured grant (CG);

encode, by the base station, the non-coherent sequence-based downlink channel over which the signal is to be transmitted; and transmit, to the UE, the signal over the non-coherent sequence-based downlink channel.

23. The apparatus of claim 22, wherein configuration of the memory and the one or more processors to encode the non-coherent sequence-based downlink channel includes configuration of the memory and the one or more processors to use a sequence based on one or more of:

at least one sequence parameter;

a time domain index modulation (TD-IM); or a spatial domain index modulation (SD-IM).

24. The apparatus of claim 22, wherein the signal transmitted over the non-coherent sequence-based downlink channel spans a plurality of symbols.

25. The apparatus of claim 22, wherein the memory and the one or more processors are further configured to:

multiplex at least one additional signal with the signal transmitted over the non-coherent sequence-based downlink channel, the at least one additional signal intended for at least one other UE.

26. The apparatus of claim 22, wherein the signal transmitted over the non-coherent sequence-based downlink channel has a format, the format of the signal dependent on one or more of:

a number of bits required to convey control information for the UE;

a reliability of the non-coherent sequence-based downlink channel; or a number of additional signals multiplexed with the signal received over the non-coherent sequence-based downlink channel.

* * * * *